March 16, 1948. C. SEAMAN 2,437,977
BLIND-STITCHED PIPING AND METHOD OF PRODUCING SAME
Filed Feb. 20, 1945 7 Sheets-Sheet 1

INVENTOR.
CHARLES SEAMAN
BY Wm. S. Pritchard
ATTORNEY.

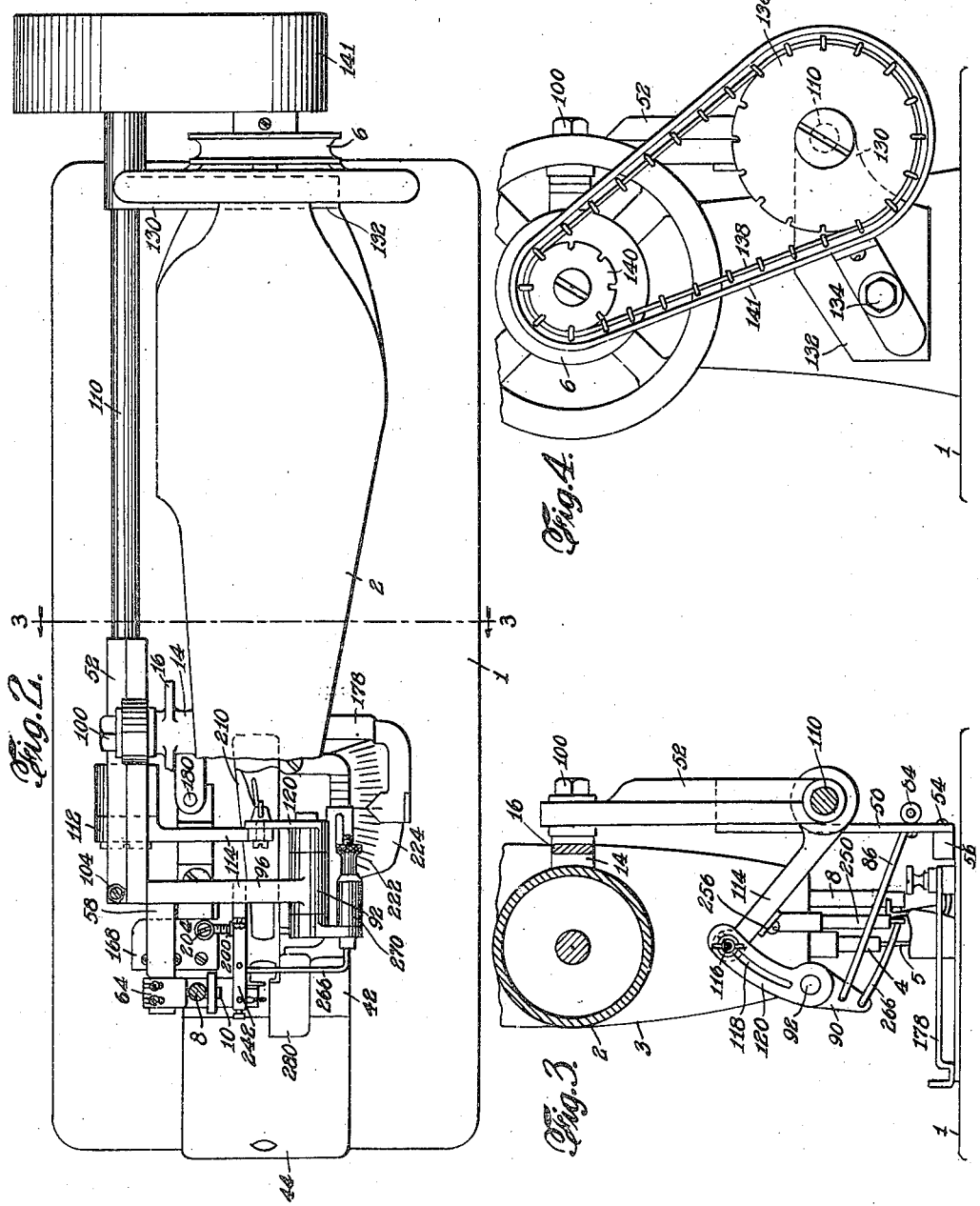

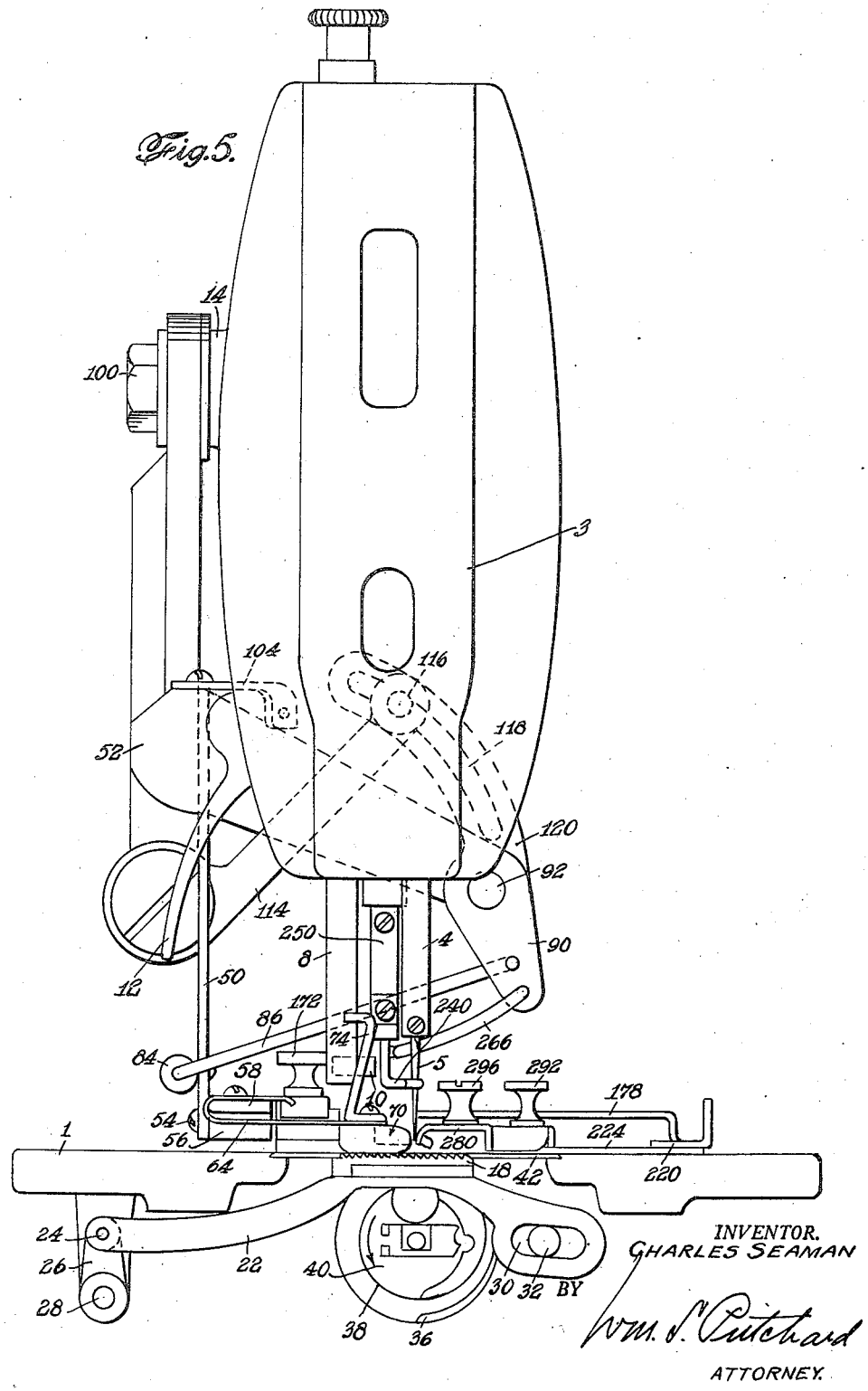

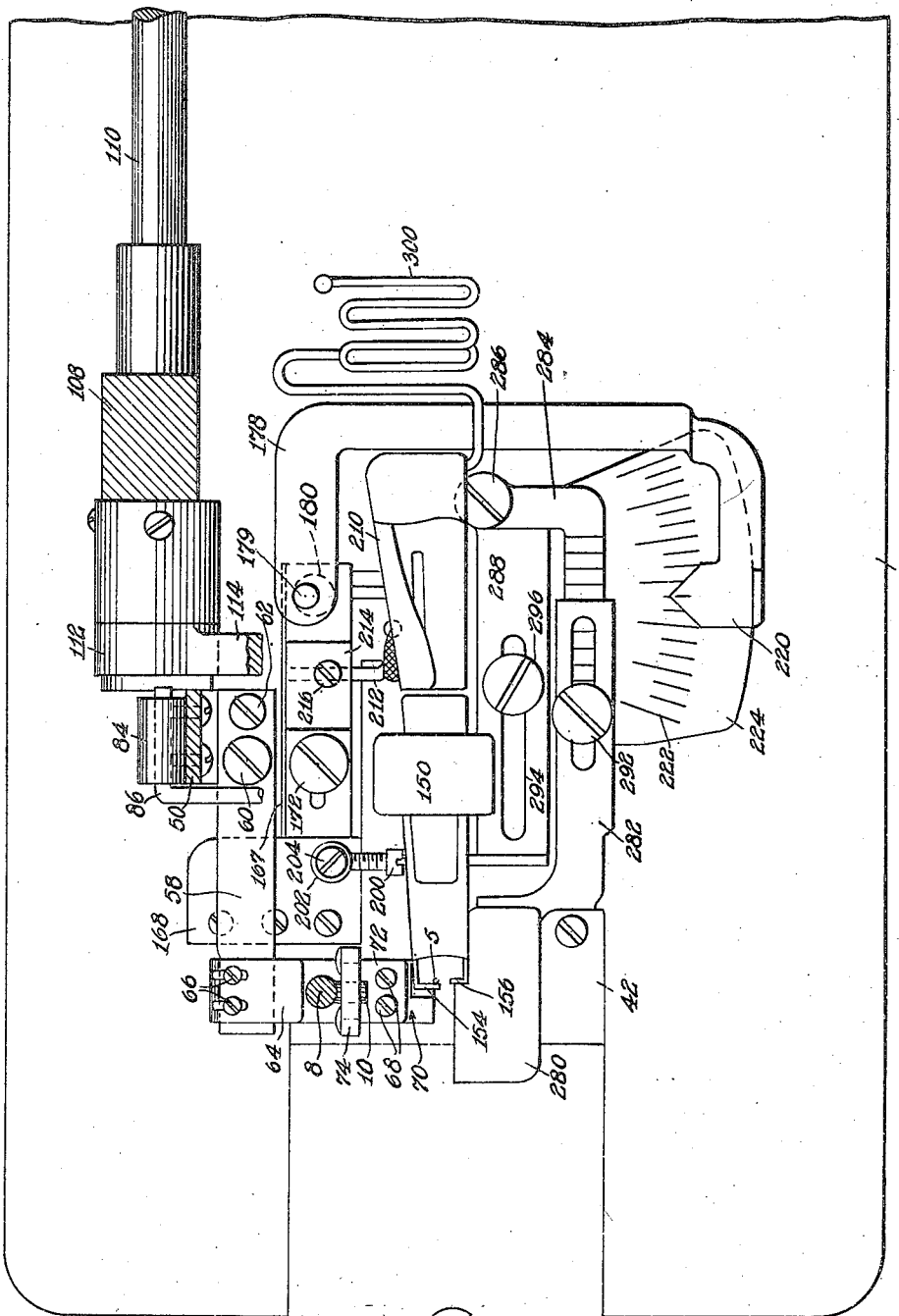

March 16, 1948.  C. SEAMAN  2,437,977
BLIND-STITCHED PIPING AND METHOD OF PRODUCING SAME
Filed Feb. 20, 1945  7 Sheets-Sheet 5
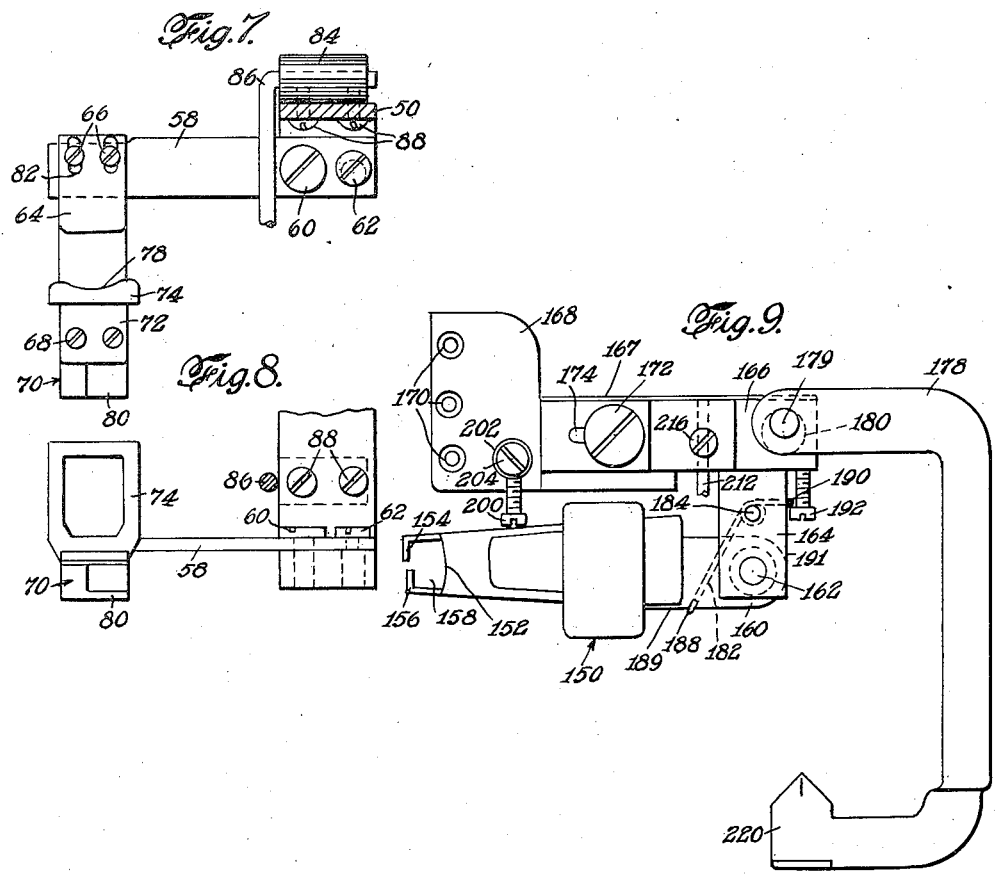
INVENTOR.
CHARLES SEAMAN
BY
ATTORNEY.

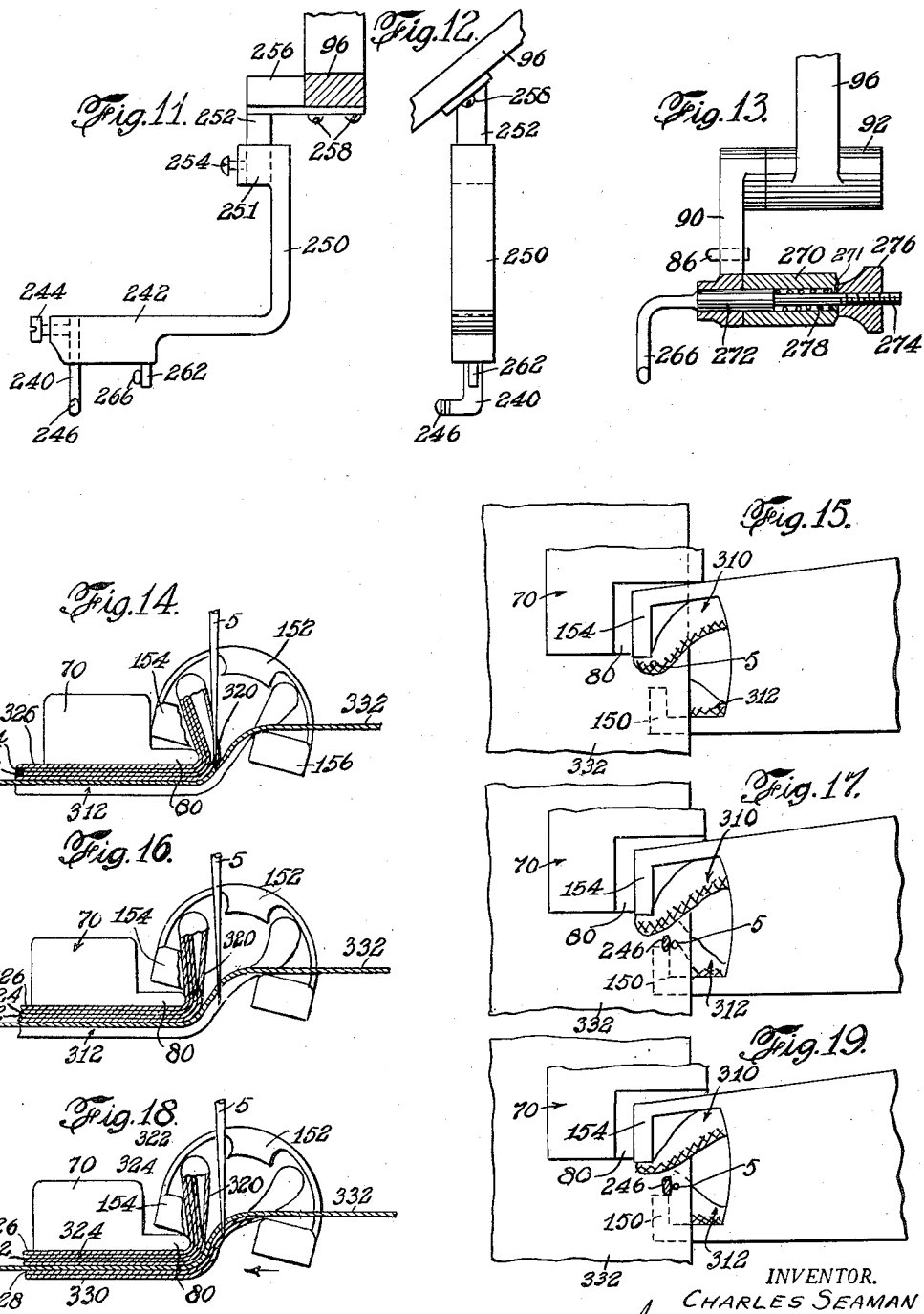

March 16, 1948.  C. SEAMAN  2,437,977
BLIND-STITCHED PIPING AND METHOD OF PRODUCING SAME
Filed Feb. 20, 1945  7 Sheets-Sheet 7
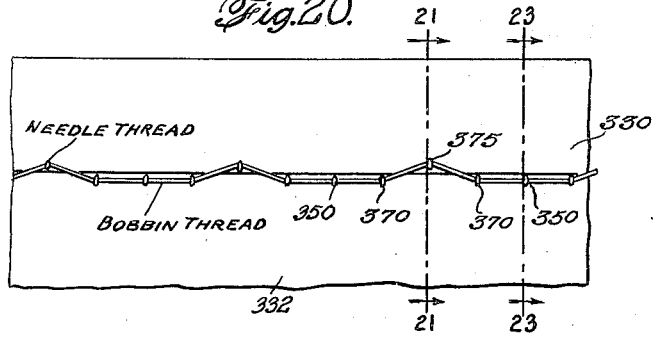
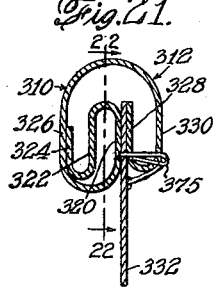
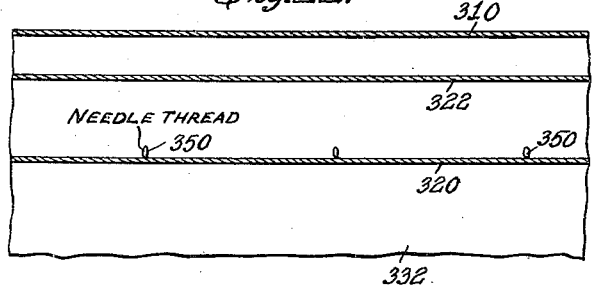
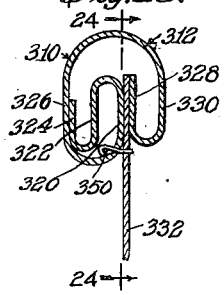
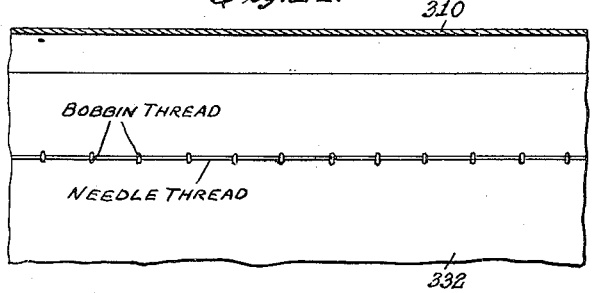
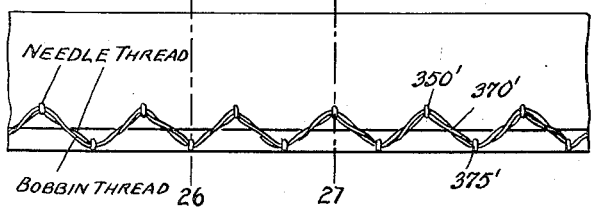
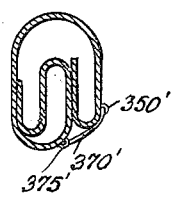
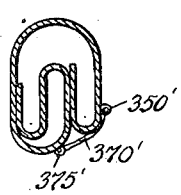
INVENTOR.
CHARLES SEAMAN
BY
Wm. S. Pritchard
ATTORNEY.

Patented Mar. 16, 1948

2,437,977

UNITED STATES PATENT OFFICE 2,437,977

BLIND-STITCHED PIPING AND METHOD OF PRODUCING SAME

Charles Seaman, Jamaica Estates, N. Y.

Application February 20, 1945, Serial No. 578,850

12 Claims. (Cl. 112—262)

This invention relates to piping, and more particularly to a new and novel form of piping, and to the method of making the same.

In United States Patents Nos. 1,742,830, 1,756,036 and 1,969,950, there is disclosed a piping which comprises a binding folded longitudinally throughout its length with the edges thereof turned inwardly to form edge folds. The bottom edge fold has two plies, and the top edge fold may have two, three, four or more plies. The plies of the top edge fold intermediate the top and bottom plies may be formed of material integral with the binding material constituting the piping or by a separate filler material. When the piping is attached to a base material, the latter is positioned intermediate the two adjacent juxtaposed plies of the top and bottom edge folds, and the materials are stitched together by a stitching which is not visible from the top of the piping and is visible only from the rear or back of the piping. The stitches pass through the under side of the lowermost ply of the top fold, through the base material (when present), and through both plies of the bottom fold without passing through the top ply of the top fold. The stitches may pass through one or more of the plies intermediate the top and bottom plies of the top edge fold. In general, the stitching also does not pass through the inner ply which is next adjacent the top ply of the top edge fold, whereby a puffed effect is imparted to the piping.

The aforementioned piping is made by passing a binding material through a folder in which it is first formed into an inverted U, then into a W, and finally into a U with the edges of the legs turned inwardly to provide edge folds. When the upper portion of the piping is to be provided with more than two plies, a separate filler is fed adjacent the longitudinal edge of the binding material which is to constitute the top fold, or such longitudinal edge of the binding material is pre-folded, i. e. turned inwardly. After the binder leaves the folder, it is bent over a presser foot and caused to pass beneath the presser foot which cooperates with feed dogs to feed the material through the machine. The presser foot is disposed in position to guide the top edge fold beneath and in the path of travel of a vertically reciprocating needle, so that the needle enters and emerges from the under side of the lowermost ply of the top fold and thereafter passes through both plies of the other edge fold to secure the two edge folds together. Depending on the position of the presser foot, the needle in its penetrating thrust may enter the under side of the lowermost ply of the top edge fold and pass through one or more of the plies of the top edge fold without passing through the two uppermost plies of said top edge fold. When the piping is formed and attached to a base material by a single stitching operation, the base material is fed at the bend of the binding between the two opposed plies of the top and bottom edge folds. The needle will pass through the base material after it emerges from the lower side of the lowermost ply of the top edge fold immediately prior to its passage through the plies of the lower edge fold and secure the edge folds together.

As previously mentioned, the aforementioned piping is characterized by a straight row of stitches, each of which stitches secures the top and bottom edge folds together and is visible from the rear thereof. Though such a piping and the method of and apparatus for making the same have been widely accepted by the trade, nevertheless the piping has the appearance of being machine-made and for this reason is not desired for use on high quality merchandise to the same extent as it is used on merchandise of cheaper quality.

An object of this invention is to provide a new and novel piping.

Another object of this invention is to provide a blind-stitched piping which by its appearance simulates hand work.

An additional object of this invention is to provide a new and novel method of producing blind-stitched piping.

A further object of this invention is to provide a method of producing blind-stitched piping which has the appearance of being made by hand.

Other and additional objects will appear hereinafter.

The above objects are accomplished, in general, by feeding a binding folded into U-shape with the edges folded inwardly to a retractable nipper shoe about which the folded binding is bent and caused to pass beneath the presser foot which cooperates with the feed dogs to feed the material through the machine, the direction of travel of the binding beneath the nipper shoe and presser foot being substantially at right angles to the direction of feed of the folded binder to the nipper shoe. For reasons which will become apparent, the top edge fold of the folded binding extends beyond the lower edge fold. The nipper shoe is adapted, when in its forward position, to position the folded piping and particularly the bend thereof in the path of a normally vertically reciprocating needle so that the needle in its penetrating thrust will enter and emerge from the same under side of the lowermost ply of the top edge fold and pass through a base material which has been positioned between the juxtaposed plies of the top and bottom edge folds and to which the piping is to be secured by a single stitching operation without passing through the other plies of the top edge fold and without passing through any of the plies of the bottom edge fold. This stitch (which is blind) secures the top edge fold to the base fabric. The nipper shoe is then retracted, in a direction away from the needle, whereby the top edge fold is positioned out of the path of the needle, and the needle in its penetrating thrust will pass through the base fabric only without passing through any of the plies of either of the edge folds. The needle thread of such a stitch lies on the top surface of the base fabric and in the final product, due to the top edge fold, is not visible. Such a stitch is also in alignment with the blind stitch which secures the top edge fold to the base fabric.

After the needle has made a predetermined number of such stitches in the base material and while the nipper shoe is still in its retracted position, the needle is engaged below the shank thereof and, due to its resiliency, inclined to its normal path perpendicular to the work, whereby the needle will penetrate the base fabric and the ply or plies of the bottom edge fold without passing through any of the plies of the top edge fold. Before the needle presents the thread to the looper the needle assumes its normal position perpendicular to the work so that the hook of the machine will cooperate with the thread loop made thereby. The shifting of the needle so that it will penetrate the plies of the lower edge fold and its subsequent penetration through the under side of the lowermost ply of the top edge fold produces a cross-stitch which is substantially V-shaped and serves to secure the bottom edge fold of the piping to the base fabric. The nipper shoe is then moved to its forward position. The sequence of steps hereinbefore described is repeated.

The apparatus for producing the piping comprises an attachment which can be quickly secured to any standard sewing machine head without mutilating the machine and whereby, when the attachment is not desired to be used, it can be easily removed and the machine will be restored to its original condition. The attachment comprises a folder which is designed to fold a binding into substantial U-shape with the edges turned inwardly to form edge folds, the top edge fold extending slightly beyond the edge of the bottom edge fold. The folder is positioned in the machine so that the folded binder, as it issues from the throat thereof, will be bent over a nipper shoe and passed beneath a presser foot which cooperates with the feed dogs of the machine to feed the binding through the machine in a direction substantially at right angles to the path of travel of the binding through the folder. The nipper shoe is adapted to dispose the edge fold (which is to constitute the top fold of the piping) in proper position so that the needle, reciprocating in a vertical path, will enter the under side of the lowermost ply and emerge from the same under side and pass through the base fabric, when present, without passing through the top ply (and the inner ply adjacent thereto, if present) of the top fold and without passing through any of the plies of the bottom edge fold.

Means are provided to retract the nipper shoe, relative to the needle at predetermined times, to position the edge fold engaged thereby, and particularly the bend thereof, out of the path of the needle so that the needle, in its normal path of travel vertical to the work, will not penetrate or pass through any of the plies of the edge folds but, however, if a base fabric has been positioned between the juxtaposed plies of the top and bottom edge plies, the needle will pass therethrough only.

At predetermined intervals, the needle is inclined from its normal vertical path of travel, by appropriate means, so that it will pass through the base fabric, if present, and the plies of the bottom edge fold. The means shifting the needle to the inclined position becomes ineffective before the needle in its penetrating thrust presents the thread to the looper, whereby the needle assumes its normal vertical position and continues in a vertical path so that the hook of the machine will cooperate with the loop formed thereby. After stitching the bottom edge fold with a substantially V-shaped cross-stitch, the nipper shoe is moved to its forward position, permitting the needle to enter and emerge from the under side of the lowermost ply of the top edge fold, as previously described. In the preferred embodiment, the nipper shoe is made integral with the presser foot. The means for shifting the needle and the means for shifting the nipper shoe are operated in timed relationship.

The invention will be more clearly understood by reference to the following detailed description when taken in connection with the accompanying drawings in which an illustrative embodiment of the invention is shown and wherein:

Figure 2 is a top plan view of the machine shown in Figure 1, with the head thereof broken away;

Figure 3 is a section taken on the line 3—3 of Figure 2;

Figure 4 is an end view of the machine shown in Figure 2 and looking to the left thereof;

Figure 5 is an end view of the machine looking to the right thereof;

Figure 6 is a top plan view, with the head of the machine omitted for the purpose of showing the other parts more clearly;

Figure 7 is a top plan view of the presser foot, including the nipper shoe, and showing the manner in which it is mounted;

Figure 8 is a front elevation of the presser foot and mounting shown in Figure 7;

Figure 9 is a top plan view showing the folder and the manner in which it is mounted;

Figure 10 is a top plan view of the guide over which the base material to which the piping is to be attached is fed;

Figure 11 is a front elevation of the mechanism for shifting the needle;

Figure 12 is an end view looking to the left in Figure 11;

Figure 13 is a front elevation, partly in section, of the mechanism for actuating the needle-shifting means;

Figure 14 is an enlarged fragmental view showing the position of the nipper shoe and, in cross-section, the position of the folds and the needle during the production of the blind stitches securing the top edge fold to the base fabric;

Figure 15 is a top plan view of the details shown in Figure 14;

Figure 16 is an enlarged fragmental view showing the position of the nipper shoe and, in section, the position of the folds when the needle is stitching only the base material;

Figure 17 is a top plan view of the details shown in Figure 16;

Figure 18 is an enlarged, fragmental view showing the position of the nipper shoe and, in cross-section, the position of the folds when the needle is inclined at the beginning of the production of the cross-stitch;

Figure 19 is a top plan view of the details shown in Figure 18;

Figure 20 is a rear plan view of one embodiment of the finished piping attached to a base fabric;

Figure 21 is a section taken on the line 21—21 of Figure 20;

Figure 22 is a section taken on the line 22—22 of Figure 21;

Figure 23 is a section taken on the line 23—23 of Figure 20;

Figure 24 is a section taken on the line 24—24 of Figure 23;

Figure 25 is a rear view of a finished piping per se;

Figure 26 is a section taken on the line 26—26 of Figure 25; and

Figure 27 is a section taken on the line 27—27 of Figure 25.

Figure 1:
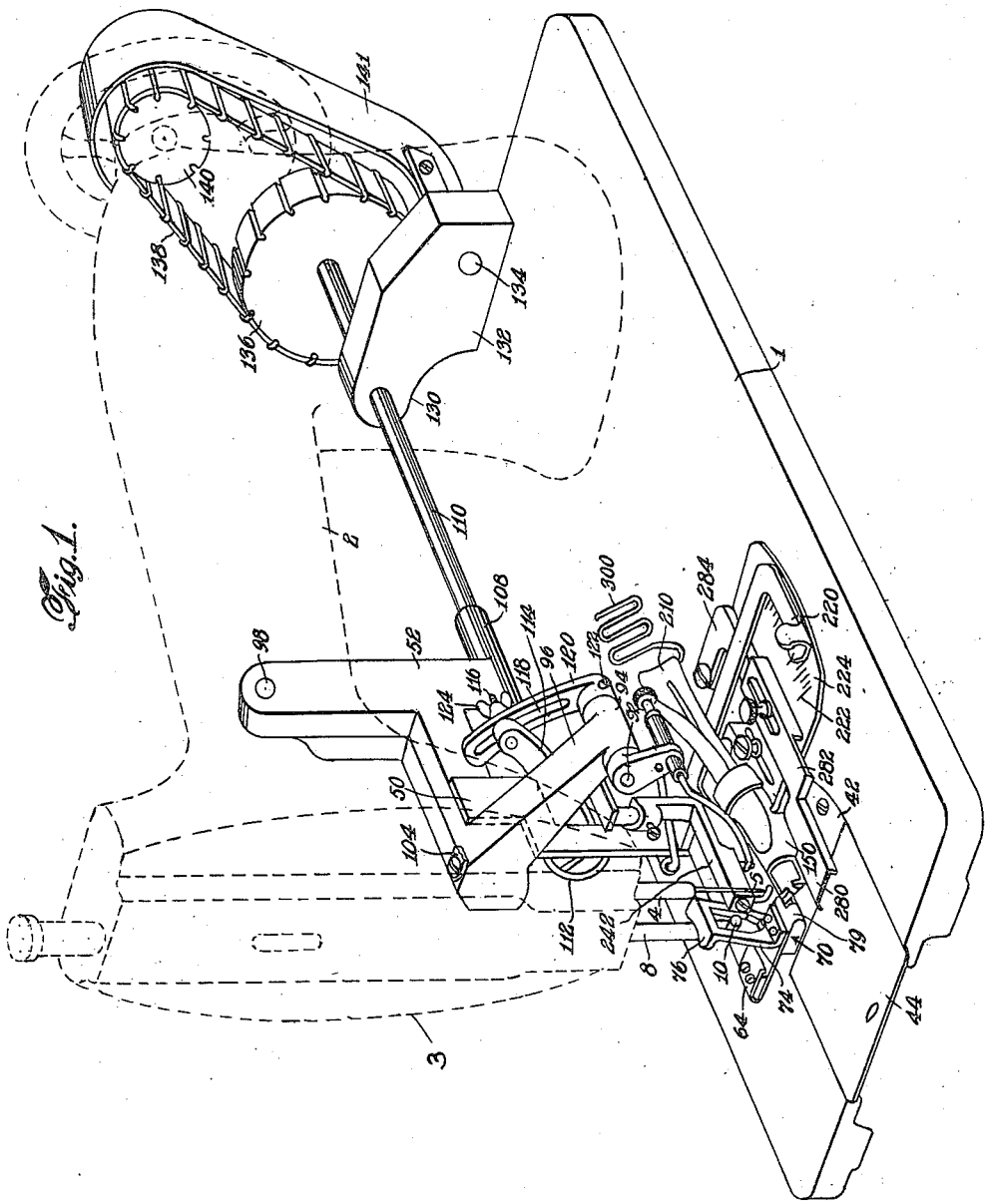
Figure 1 is a perspective view of a sewing machine head having the attachment in position.

Referring now to the drawings wherein like reference numerals designate like parts, the reference numeral 1 (Figures 1, 2, 5 and 6) designates the base of a sewing machine head of any standard type carrying a standard and overhanging arm 2 provided at one end with a needle head 3, in which reciprocates a needle bar 4 carrying a needle 5. The vertically reciprocating needle bar 4 may derive its power from any suitable source, as, for example, a pulley 6 (see Figure 2), driven by a belt (not shown). Slidably mounted in the head 3 is a presser foot bar 8 carrying a screw 10 and adapted to be drawn upwardly by means of an operating lever 12. On the rear face of the overhanging arm 2, there is provided a stud 14 (see Figure 2) on which a lever 16 is mounted intermediate its ends. Though not shown in the drawings, one end of the lever 16 is secured to the presser foot bar 8 and the other end of the lever 16 is connected to one end of a lever, the other end of which terminates beneath the base 1 and is adapted to be engaged by the knee of the operator to elevate the presser foot bar 8. The machine is provided with feed dogs 18 which are carried upon a four-motion feed dog-operating lever 22 (see Figure 5). One end of the feed dog-operating lever 22 is pivoted at 24 on one end of a link 26, and the other end of the link 26 is mounted on a rock shaft 28. The opposite end of the feed dog-operating lever 22 is provided with a slot 30. A pin 32 is positioned in the slot 30 and is mounted eccentrically of a rock shaft (not shown). The feed dog-operating mechanism just described is a standard four-motion feed dog-actuating mechanism. The machine is also provided with a hook 36 and a bobbin case 38 in which a bobbin 40 is secured in the usual manner. The machine is also provided with a throat plate 42 and a sliding cover plate 44.

The details of construction of the sewing machine head and the appurtenant mechanisms thus far described are those found in any standard sewing machine, such as a 95—10 Singer sewing machine.

The standard presser foot employed in standard sewing machines is removed and, in place thereof, there is provided a presser foot of a special construction and mounted in the machine as will now be described. A flat spring 50 (see Figures 1, 3 and 5) is secured at the upper end thereof to a bracket 52, which bracket will be more fully explained hereinafter. At its lower end, the spring 50 is secured by means of screws 54 to a channeled block 56 (see Figures 3 and 5). A lever 58 (see Figure 7) is positioned in the channel of the block 56 and pivotally mounted on a screw 60. For reasons which will become apparent, the lever 58 is, adjacent one end thereof, mounted on an eccentric 62 in the block 56. On the other end of the lever 58, a spring 64 is attached by means of screws 66. The outer end of the spring 64 is secured by screws 68 to a presser foot, generally indicated by the reference numeral 70, and a flange 72 of a lifting ear 74 which is adapted to cooperate with the screw 10 on the presser foot bar. As shown in Figures 1 and 7, the lifting ear 74 is provided at the top thereof with a horizontally extending flange 76 provided with a curved surface 78 of substantially the same radius as the presser foot bar 8 and is adapted to embrace said presser foot bar 8.

The presser foot, generally designated by the reference numeral 70, is provided with a rounded toe 79 and a lateral extension 80 which constitute a nipper shoe. By virtue of slots 82 in the spring 64, the spring 64, and hence the presser foot 70, may be generally adjusted forward and away from the needle 5. The screws 66 will secure the spring 64 in adjusted position. For fine adjustment of the presser foot 70 relative to the needle 5, the eccentric 62 is turned in the proper direction.

On the rear surface of the spring 50, there is provided a boss 84 in which one end of a link 86 is secured. In the form shown in Figures 6 and 7, the boss 84 is secured to the spring 50 and the link 86 is secured in the boss 84 by means of the screws 88. The other end of the link 86 is secured to a crank 90 (Figures 1 and 3). The crank 90 is secured on a rock shaft 92 carried in a bearing 94 on an arm 96 of the bracket 52. Thus, upon actuation of the rock shaft 92, the link 86 will be reciprocated back and forth, which reciprocating movement will be imparted to the spring 50 with the result that the presser foot 70 will be reciprocated at predetermined times back and forth relative to the needle 5. The mechanism for actuating the rock shaft 92 will now be described.

The bracket 52 is provided with a hole 98 (see Figure 1) whereby it is positioned on the stud 14 and secured in place by a nut 100 (see Figures 2 and 3). The bracket 52 is also supported on the head of the machine by a support 104 (see Figure 5).

As shown in Figure 1, the bracket 52 at the lower end thereof is provided with a horizontal bearing 108 through which a shaft 110 extends. The shaft is positioned above the work support 1 and at the rear thereof. On one end of the shaft 110, there is secured an eccentric 112 carrying an arm 114 (see Figures 1, 3 and 6). The arm 114 carries at the end thereof a threaded pin 116 which extends in a slot 118 of a lever 120, one end of which is secured by a set screw 122 on the rock shaft 92 (see Figures 1 and 3). A wing nut 124 secures the eccentrically mounted arm 114 in adjusted position in the lever 120.

The shaft 110 is carried, as shown in Figures 1 and 4, in a boss 130 of a bracket 132 which is attached to the sewing machine head by means of a bolt 134. The shaft 110 carries a pulley 136 engaging a belt 138 which is driven by a pulley 140 attached to the drive shaft of the machine adjacent the driving pulley 6 thereof. A housing 141 is appropriately mounted to surround the pulleys 126 and 140 and the belt 138.

From the foregoing description, it is apparent that during operation of the machine the link 86 will be reciprocated back and forth. When the spring 50 is actuated so that it will move away from the operator, the block 56 carrying the lever 58 will also be moved in a direction away from the operator, and hence the presser foot will be moved away from the needle 5 and the nipper shoe 80 will be retracted. When the spring is actuated so that it will move in a direction toward the operator, the block 56, and hence the presser foot, will be moved toward the needle 5 and the nipper shoe 80 will be in its forward operating position.

In order to fold the binding, there is provided a folder, generally designated by the reference numeral 150. This folder is of such a construction that it will fold the binding fed therethrough first into an inverted U, then into a W, and finally into a U with the edges of the legs turned inwardly to provide edge folds, with the outer edge of the top edge fold extending beyond the outer edge of the lower edge fold. It is to be noted that the folder 150 (see Figures 1, 3 and 9) is provided with a curved edge 152 which slopes oppositely downward toward and below the top of the end plates 154 and 156, thereby tending to cause the folds of the binding as they pass downwardly through the throat 158 to slide along the edge 152 toward the end plates 154 and 156, which act as limiting abutments to hold the extreme edges of the folded binding in proper feeding position. A suitable construction of such a folder is shown in United States Patents Nos. 1,742,830, 1,756,036 and 1,969,950. Due to the difference in size of the edge folds, the end pieces 154 and 156 are offset, the end piece 154 which is to cooperate with the top edge fold extending beyond the end piece 156. In position in the machine, the end piece 154 overlaps the nipper shoe 80 and is spaced slightly therefrom so that the reciprocation of the nipper shoe will not affect it (see Figures 1, 6, 14–19 inclusive). Since the precise details of construction of the folding mechanisms of the folder 150 per se form no part of this invention, further description thereof is not deemed necessary.

As shown in Figure 9, the folder 150 is carried on one end of a flat spring 160, the other end of said spring 160 being pivotally secured at 162 to an extension 164 of a slide 166 slidably mounted in a channel of a block 167 carried by a plate 168, which is secured onto the base of the machine by means of screws in the countersunk holes 170. A screw 172 cooperates with a slot 174 in the slide 166 for reasons which will hereafter appear.

The adjustment means comprises a lever 178 having an extension 179 extending downwardly through the end of the slide 166 and pivoted to the block 167 and provided with an eccentric 180 engaging in the end of the slide 166 so that, by swinging the lever 178 in one direction or the other, the eccentric will correspondingly swing the slide 166 to move the folder. Obviously, sufficient clearance may be provided either at the screw 172 or at the eccentric 180 to permit the necessary reciprocation of the slide 166 to take place as the eccentric 180 is rotated. The lever 178 has substantial friction provided by any suitable means, such as by having the pivot screw 172 fairly tight, so that it readily remains where it is placed in to maintain the folder in position. A set screw 192 secures the slide 166 in adjusted position.

The folder 150 is yieldingly held in position by means of a spring 182 coiled about a securing screw 184. One end 188 of spring 182 is bent to engage the edge 189 of the spring 160, and the other end 190 is bent into position adjacent the edge 191 of the extension 164. A stop 200, adjustably carried by a post 202 on the support 168, limits the lateral movement of the folder 150 by the spring 182. A set screw 204 secures the stop 200 in adjusted position. It is to be noted (see Figures 14 and 15) that the folder, and particularly the end plates 154 and 156, is inclined with respect to the base of the machine.

In the embodiment of the invention wherein the top edge fold is provided with three or four plies, the binding material is folded inwardly at the longitudinal edge of the material which is to constitute the top edge fold prior to passage through the folder 150. As is obvious, the extent of the infold determines the number of plies to be provided intermediate the top and bottom plies of the top edge fold. To produce this result, a folder 210 is disposed so that the delivery end thereof is positioned adjacent the receiving end of the folder 150 (see Figure 6). The folder 210 is secured in any appropriate manner to one end of a supporting rod 212 which is adjustably mounted in a block 214. A screw 216 secures the supporting rod 212 in adjusted position.

It is apparent that upon actuation of the lever 178, the slide 166 will be moved about the pivot 172 whereby the folders, and particularly the end pieces 154 and 156 of the folder 150, will be finely adjusted relative to the needle.

The adjusting lever 178 extends to the front of the machine and is provided at the free end thereof with a pointer 220 which cooperates with a scale 222 on a plate 224. The shape of the adjusting lever 178 is such that relatively large movements thereof are translated into relatively small movements to the slide and thereby permits the fine adjustment. The plate 224 is a part of the plate 226 which is secured in position on the base of the machine by means of a screw (not shown) passing through the hole 228.

As previously mentioned, the needle 5 is shifted laterally at predetermined times to produce a cross-stitch. The mechanism for shifting the needle will now be explained. As shown in Figures 1, 11 and 12, a needle pusher finger 240 is adjustably secured in a horizontal arm 242 of a support by means of a set screw 244. The pusher finger 240 is L-shaped, and the free end thereof, which is adapted to engage and shift the needle 5 as will be hereafter explained, is provided with a cam surface 246. In order that the cam surface 246 effectively engage the needle 5, it is preferably roughened or corrugated. The horizontal arm 242 is made integral with a vertical arm 250 which is provided with a boss 251 at the top thereof and adjustably mounted on a post 252. A set screw 254 secures the arm 250 in proper position on the post 252. The post 252 is secured at one end of a spring 256, the other end of the spring 256 being secured by screws 258 to the arm 96 of the bracket 52.

The shape of the bracket suspended from the spring 256 as formed by the arms 242 and 250 is such that the free end 246 of the pusher finger 240 will be normally positioned to the left of and in spaced relationship with the needle (as shown in Figure 1) so that upon movement of the support the cam end 246 will move to engage the needle and push it toward the right, whereby the needle 5 will be inclined until the end 246 moves out of contact therewith and permits the needle to assume its normal vertical position.

The arm 242 is provided with a pin 262 which is adapted to be engaged at predetermined periods of time by a finger 266, whereby the desired movement of the needle pusher finger 240 is effected. The finger 266 (see Figures 1 and 13) is curved and the horizontal portion thereof is mounted in a housing 270 carried on the rock lever 90. The finger 266 is provided with an enlargement 272 which is slidably mounted in the housing 270. Extending from the enlargement 272 is a threaded stem 274 which cooperates with a nut 276 whereby the pusher finger 266 may be adjusted so that it can engage the pin 262 at the desired predetermined intervals. A spring 278 coiled around the stem 274, and engaging the end of the enlargement 272 and the shoulder 271, helps to maintain the pusher finger 266 in proper position. The finger 266 is provided with a cam surface where it engages the pin 262. It is apparent from the foregoing that during operation of the machine the finger 266 will, at predetermined times as the lever 90 is rocked away from the operator (to the left in Fig. 5), engage the pin 262 at the left thereof and cam the spring-suspended bracket carrying the needle pusher finger 240 to the right as seen in Fig. 2, whereby the latter will engage the needle during at least a part of its downward stroke. Due to the resiliency and flexibility of the needle below the shank thereof, such portion of the needle will be shifted (bent) to the right and caused to assume an inclined position, whereby it will be in position to penetrate the plies of the bottom edge fold without passing through any of the plies of the top edge fold. As the needle descends and before it presents the thread to the looper, the needle-shifting means is retracted and the needle assumes its normal vertical position. When the pin 262 is released from engagement with the pusher finger 266, the spring 256 will restore the bracket, and hence the pusher finger 240, to its original position.

The apparatus hereinbefore described will produce a piping, one embodiment of which is shown in Figures 25 and 26 of the drawings. It is to be noted that such piping is not stitched to a base fabric. In use, such a piping is attached to a base fabric by a separate stitching operation. When, however, it is desired to form and secure the piping to a base fabric by a single stitching operation, the base fabric is fed so that the longitudinal edge thereof will be positioned intermediate the juxtaposed plies of the top and bottom edge folds at the bend thereof, as hereafter more fully explained.

For the purpose of facilitating the feeding of the base fabric, there is provided a guide 280 (see Figures 6 and 10) which is mounted on an arm 282 which is slidably mounted on a lever 284 which is pivoted on a screw 286 carried in an ear of a plate 288. The arm 282 is provided with a slot 290 and, by means of the screw 292 cooperating therewith, can be adjusted and secured in desired position on the lever 284. The plate 288 is also provided with a slot 294 whereby it may be adjusted relative to the plate 226. A set screw 296 positioned in the slot 294 and cooperating with a threaded hole (not shown) in the plate 226 secures the plate 226 in adjusted position.

The plate 226 is also provided with a dowel 298 which is adapted to cooperate with an oil hole (not shown) in the base of the machine.

In operation, a binding material is fed from a suitable source of supply through a tensioning gate 300 which is carried by the pre-folder 210. From the tensioning gate 300, the binding material is fed through the pre-folder 210 whereby the longitudinal edge which is to form part of the top edge fold is turned over and inwardly of the binding material. From the folder 210, the folded material is fed through the folder 150 where the binding is folded first into an inverted U, then into a W, and then into a U with the legs thereof inturned.

When the binding leaves the folding mechanisms of the folder 150 and passes over the edge 152, it will be noted that the edge fold 310 which is to constitute the top of the piping comprises four plies 320, 322, 324 and 326, and the edge fold 312 which is to constitute the bottom of the piping comprises two plies 328 and 330. As shown in Figures 21 and 23, the top edge fold 310 is slightly larger than and extends beyond the edge of the bottom edge fold 312. As shown in Figures 15, 17 and 19, the end plates 154 and 156 act as limiting abutments to hold the extreme edges of the respective edge folds 312 and 310 in proper feeding position. As the folded binding passes from the throat, it is bent at right angles to its previous direction of travel about the nipper shoe 80 and passed beneath the presser foot 70. As shown in Figures 14, 16 and 18, a base fabric 332 is fed and positioned intermediate the plies 320 and 328. As shown in Figures 14 and 15, at the beginning of the operation with the lever 90 rocked toward the operator the nipper shoe 80 will engage and position the bend of the edge fold 310, and particularly that portion extending beyond the outer edge of the bottom edge fold, in the path of the needle, which is at this time reciprocating in a vertical path, so that the needle 5 enters and leaves the top fold 310 from the under side of the ply 320. The needle, after emerging from the ply 320, will then pass through the base fabric 332, which has been fed into the machine as previously described. It is to be noted that in this stitching by the needle 5, the needle does not pass or penetrate through the plies 322 and 324 of the top fold 310 and that, due to the fact that the inner edge of the top edge fold extends beyond the inner edge of the bottom edge fold, it also does not pass through the plies 328 and 330 of the plies of the bottom edge fold 312, or any part thereof. Thus, the stitch 350 secures the top edge fold 310 to the base fabric 332 (Fig. 23) and is blind, i. e. invisible from the top of the finished piping. Prior to the next penetration of the needle 5, the nipper shoe 80 is retracted by the rock lever 90 and, as shown in Figures 16 and 17, both the top and bottom edge folds 310 and 312 are shifted out of the path of travel of the needle whereby only the base fabric 332 is stitched with straight stitches 370. After making a predetermined number of such straight stitches 370 and while the nipper shoe is still in its retracted position, the pusher finger 266 is actuated by further rocking of the lever 90 to the left (Fig. 5) to engage the pin 262 whereby the support is raised so that the pusher finger cam 246 engages the needle below the shank thereof and shifts the needle to an inclined position (toward the driving end of the machine), such as is diagrammatically shown in Figure 18. The shifting or bending of the needle 5 is such that it clears the top edge fold and is in position to pass through the base fabric 332 and both plies 328 and 330 of the bottom edge fold 312 without passing through any of the plies of the top edge fold 310. The pusher finger 240 is maintained (by the proper cooperation of the pusher finger 266 and the pin 262) in contact with the needle until the needle, in its descending stroke, has penetrated through the base fabric 332 and before it has presented the needle thread in position for cooperation with the looper. At this time, the finger 266 is retracted from the pin 262 whereby, due to the action of the spring 256, the support carrying the needle pusher finger 240 is restored to its original position and the needle pusher finger is removed from contact with the needle and the needle assumes its normal reciprocating path. The shifting and release of the needle forms (as shown in Figure 21) a V-shaped cross-section 375. Thereafter, the nipper shoe 80 is moved to its forward position and the stitching operation, as previously described, repeated. It is apparent that any desired number of straight stitches 370 may intervene between the blind stitch 350 and the cross-stitch 375 depending upon the ratio of the pulleys 136, 140. A ratio of 4:1 will produce the stitch shown in Figs. 20 to 24. As shown in Figs. 1 and 4, the pulleys have a 2:1 ratio which would produce alternate cross and straight stitches.

In the finished piping attached to a base material as just described, the ply 322 of the upper fold will impart a puffed effect to the piping and no stitches will be visible from the top of the piping. As shown in Figures 21 and 23, the portions of straight stitches 370 on the base fabric 332 are in very close proximity to the inner edge of the piping and concealed thereby. On the rear (see Figure 20), the cross-stitches 375 are visible and the straight stitches 370 are in close proximity to the inner edge of the piping. Frequently, the straight stitches 370 are not visible from the back of the piping when viewed at right angles. Depending on the nature of the material of which the binding is made, the inner lower edge of the piping may sometimes entirely conceal the straight stitches. It is to be noted that the top edge fold of the piping between the blind stitches is not secured and that the opposite bottom edge portion of the piping is not secured intermediate the cross-stitches.

Best results are obtained when thread of a color the same as the piping is used. When the thread constituting the stitches are under appropriate tension, the product will simulate a hand-made product. Due to the nature of the stitches, the latter will not break when tension is applied longitudinally of the material and the piping is flexible and resilient.

When a piping per se (not attached to any base fabric) is desired, the base fabric 332 is omitted and only the binding fed through the machine, wherein the same sequence of operations previously described will take place. As shown in Figure 26, the piping is characterized by a cross-section which is substantially oval or elliptical. Since in the production of this piping the stitches 370' lying intermediate the blind stitch 375' and the cross-stitch 350' do not pass through any material, they will, as shown in the drawing, be present as floats, in which the needle and bobbin threads are twisted around each other.

When the top edge fold comprises four plies, the needle will in its penetrating thrust enter from the under side of the bottom ply thereof and may, if desired, pass through the intermediate ply adjacent thereto and leave from said under side of the bottom ply without passing through the top ply or the intermediate ply adjacent thereto which gives the puffed effect.

By appropriate adjustment of the eccentric arm 114 in the slotted lever 120 or by the adjustment of the finger 266 in the housing 270, the throw of the pusher finger 266 may be adjusted to produce any size of cross-stitches. In the pipings shown in Figures 20-27 inclusive, the following sequence of steps were used:

(1) Nipper shoe in forward position whereby blind stitch is formed;

(2) Nipper shoe retracted whereby base fabric only is stitched;

(3) Nipper shoe retracted and needle shifted whereby base and lower edge fold are stitched;

(4) Nipper shoe retracted whereby base fabric only is stitched.

Above steps repeated in sequence.

Obviously, the time intervals between the operations may be varied whereby any number of straight stitches may be formed between the blind and cross-stitches.

Though in the embodiment of the invention above described the piping is described as comprising four plies in the upper edge fold and two plies in the bottom edge fold, it is to be understood that the invention is not restricted to such precise piping. In general, the top edge fold comprises at least two plies and any number of plies may be positioned therebetween to constitute a filler. The filler may be an integral part of the binding material or may be separate. The bottom edge fold may consist of a single ply or of more than two plies as may be desired.

Though in the preferred form, the nipper shoe is formed integral with the presser foot, the invention is not restricted thereto. The nipper shoe may be independent of the presser foot, in which case the presser foot need not be retractable and only the nipper shoe retractable.

Though the invention been described in connection with a specific standard type of sewing machine (Singer 95—10), it is to be understood that the attachment can be used with any of the other standard type single-needle machines. For example, when used with a Wilcox-Gibbs single-needle machine, the bracket 52 will need to be modified so that it can be properly suspended from the head, but such modification will be readily apparent to one skilled in the art.

The invention provides a new and improved form of piping which, due to the mode of stitching, appears as if hand-made and, therefore, may be used on any quality merchandise. The attachment for producing the piping can be attached to the sewing machine head without mutilation thereof and may be removed when not desired.

No claims to the apparatus for producing the piping are presented herein, since such claims form the subject matter of my copending application Serial No. 578,851, filed on even date herewith. Also, no claims to the apparatus for and method of making the cross-stitch are presented herein, since such claims form the subject matter of my copending application Serial No. 578,848, filed on even date herewith.

Since it is obvious that various changes and modifications may be made in the above description without departing from the nature or spirit thereof, this invention is not restricted thereto except as set forth in the appended claims.

I claim:

1. The method of forming a blind-stitched piping which comprises feeding a binding material folded longitudinally thereof with at least one of the edges turned inwardly to form a top edge fold having at least top and bottom plies, bending the said folded binding transversely to the feed thereof, stitching with a vertically reciprocating needle through the bottom ply of the top edge fold at the bend thereof from the under surface thereof whereby such stitch enters and emerges from said under surface of said bottom ply without passing through said top ply and without passing through the opposite edge portion of the binding, shifting said bend out of the vertical path of travel of the needle, and thereafter at a predetermined time stitching through the opposite edge portion of the binding with a cross-stitch joined to said first stitch.

2. The method of forming a blind-stitched piping which comprises feeding a binding material folded longitudinally thereof with at least one of the edges turned inwardly to form a top edge fold having at least top and bottom plies, bending the said folded binding transversely to the feed thereof, stitching with a vertically reciprocating needle through the bottom ply of the top edge fold at the bend thereof from the under surface thereof whereby the needle enters and emerges from said under surface of said bottom ply without passing through said top ply and without passing through the opposite edge portion of the binding, shifting said bend out of the vertical path of travel of the needle whereby the needle does not pass through the binding, and thereafter at a predetermined time inclining the needle to stitch through the opposite edge portion of the binding with a cross-stitch joined to said first stitch.

3. The method of forming a blind-stitched piping which comprises feeding a binding material folded longitudinally thereof with at least one of the edges turned inwardly to form a top edge fold having at least top and bottom plies, bending the said folded binding transversely to the feed thereof, stitching with a vertically reciprocating needle through the bottom ply of the top edge fold at the bend thereof from the under surface thereof whereby the needle enters and emerges from said under surface of said bottom ply without passing through said top ply and without passing through the opposite edge portion of the binding, shifting said bend out of the vertical path of travel of the needle whereby the needle does not pass through the folded binding, thereafter at predetermined times inclining the needle to stitch through the opposite edge portion of the binding with a cross-stitch joined to said first stitch, and causing the needle to assume its normally vertical path of travel at a time to permit the bobbin thread to pass through the loop formed in making the cross-stitch.

4. The method of forming a blind-stitched piping which comprises feeding a binding material folded longitudinally thereof with at least one of the edges turned inwardly to form a top edge fold having at least top and bottom plies, bending the said folded binding transversely to the feed thereof, positioning a base fabric at the bend and between the lower ply of the top edge fold and opposite edge portion of the folded binding, securing the top edge fold to the base fabric by a blind stitch, stitching the base fabric only with a plurality of straight stitches, and thereafter securing the opposite edge portion of the binding to said base fabric with a cross-stitch.

5. The method of forming a blind-stitched piping which comprises feeding a binding material folded longitudinally thereof with at least one of the edges turned inwardly to form a top edge fold having at least top and bottom plies, bending the said folded binding transversely to the feed thereof, positioning a base fabric at the bend and between the lower ply of the top edge fold and the opposite edge portion of the folded binding, stitching through the bottom ply of the top edge fold at the bend thereof from the under surface thereof whereby such stitch enters and emerges from said under surface of said bottom ply and passes through said base fabric without passing through said top ply and without passing through the opposite edge portion of the binding, shifting said bend out of the vertical path of travel of the needle whereby the base fabric only is stitched with a plurality of straight stitches, and thereafter at a predetermined time stitching through the base fabric and the opposite edge portion of the binding with a cross-stitch without passing through the top edge fold to secure said opposite edge portion to said fabric.

6. A piping comprising a binding folded longitudinally thereof with at least one of the edges turned inwardly to form a top edge fold having at least top and bottom plies, said piping having a blind stitch entering and emerging from the under surface of said bottom ply without passing through said top ply or the opposite edge portion, a cross-stitch passing through the opposite edge portion, and a predetermined number of straight stitches intermediate and continuous with said blind and cross-stitches, said intermediate stitches not passing through any part of the binding.

7. A piping comprising a binding folded longitudinally thereof with at least one of the edges turned inwardly to form a top edge fold having at least top and bottom plies, a base fabric having one of its longitudinal marginal portions positioned between the bottom ply of said top edge fold and the opposite edge portion of the binding, a blind stitch securing the top edge fold to said base fabric, a cross-stitch passing through the opposite edge portion and said base fabric to secure said opposite edge portion to said fabric, and a predetermined number of straight stitches intermediate and continuous with said blind and cross-stitches and passing through the base fabric only.

8. A piping comprising a binding folded longitudinally thereof with at least one of the edges turned inwardly to form a top edge fold having at least top and bottom plies, a base fabric having one of its longitudinal marginal portions positioned between the bottom ply of said top edge fold and the opposite edge portion of the binding, a blind stitch securing the top edge fold to said base fabric, a cross-stitch passing through the opposite edge portion and said base fabric to secure said opposite edge portion to said fabric, and a predetermined number of straight stitches intermediate and continuous with said blind and cross-stitches and passing through the base fabric only, the portions of said intermediate stitches on top of the base fabric being substantially concealed by the top edge fold.

9. A piping comprising a binding folded longitudinally thereof with at least one of the edges turned inwardly to form a top edge fold having at least top and bottom plies, a base fabric having one of its longitudinal marginal portions positioned between the bottom ply of said top edge fold and the opposite edge portion of the binding, a blind stitch securing the top edge fold to said base fabric, a cross-stitch passing through the opposite edge portion and said base fabric to secure said opposite edge portion to said fabric, and a predetermined number of straight stitches intermediate and continuous with said blind and cross-stitches and passing through the base fabric only, the portions of said intermediate stitches on the bottom of said base fabric being in close proximity to the inner edge of the bottom edge portion of the piping.

10. A piping comprising a binding folded longitudinally thereof with at least one of the edges turned inwardly to form a top edge fold having at least top and bottom plies, a base fabric having one of its longitudinal marginal portions positioned between the bottom ply of said top edge fold and the opposite edge portion of the binding, a blind stitch entering and emerging from the under surface of said bottom ply and passing through said base fabric without passing through said top ply or the opposite edge portion, a cross-stitch passing through the base fabric and the opposite edge portion to secure said opposite edge portion to said fabric, and a predetermined number of straight stitches intermediate and continuous with said blind and cross-stitches and passing through said base fabric only.

11. A piping comprising a binding folded longitudinally thereof with at least one of the edges turned inwardly to form a top edge fold having at least top and bottom plies, a base fabric having one of its longitudinal marginal portions positioned between the bottom ply of said top edge fold and the opposite edge portion of the binding, a blind stitch entering and emerging from the under surface of said bottom ply and passing through said base fabric without passing through said top ply or the opposite edge portion, a cross-stitch passing through the base fabric and the opposite edge portion to secure said opposite edge portion to said fabric, and a predetermined number of straight stitches intermediate and continuous with said blind and cross-stitches and passing through said base fabric only, the portions of said intermediate stitches on top of the base fabric being substantially concealed by the top edge fold.

12. A piping comprising a binding folded longitudinally thereof with at least one of the edges turned inwardly to form a top edge fold having at least top and bottom plies, a base fabric having one of its longitudinal marginal portions positioned between the bottom ply of said top edge fold and the opposite edge portion of the binding, a blind stitch entering and emerging from the under surface of said bottom ply and passing through said base fabric without passing through said top ply or the opposite edge portion, a cross-stitch passing through the base fabric and the opposite edge portion to secure said opposite edge portion to said fabric, and a predetermined number of straight stitches intermediate and continuous with said blind and cross-stitches and passing through said base fabric only, the portions of said intermediate stitches on the bottom of said base fabric being in close proximity to the inner edge of the bottom edge portion of the piping.

CHARLES SEAMAN.

REFERENCES CITED

The following references are of record in the file of this patent:

UNITED STATES PATENTS

| Number | Name | Date |
|---|---|---|
| 364,586 | Green | June 7, 1887 |
| 498,331 | Tracy | May 30, 1893 |
| 1,969,950 | Seaman | Aug. 14, 1934 |